(12) United States Patent
Wake et al.

(10) Patent No.: US 7,344,332 B2
(45) Date of Patent: Mar. 18, 2008

(54) SPACER SUITABLE FOR USE WITH DISK BRAKE INCLUDING CALIPER

(75) Inventors: Masaki Wake, Aichi (JP); Masahiko Nakajima, Aichi (JP); Takuya Suzuki, Aichi (JP)

(73) Assignee: Advics Co., Ltd., Kariya, Aichi (JP)

( * ) Notice: Subject to any disclaimer, the term of this patent is extended or adjusted under 35 U.S.C. 154(b) by 0 days.

(21) Appl. No.: 10/715,509

(22) Filed: Nov. 19, 2003

(65) Prior Publication Data

US 2004/0141806 A1 Jul. 22, 2004

(30) Foreign Application Priority Data

Nov. 21, 2002 (JP) .............................. 2002-338432

(51) Int. Cl.
*F16D 1/00* (2006.01)
(52) U.S. Cl. ................................ 403/408.1; 188/218 A
(58) Field of Classification Search ............ 188/218 A; 411/352, 353, 508, 521, 526, 913, 999; 403/62, 403/150, 408.1
See application file for complete search history.

(56) References Cited

U.S. PATENT DOCUMENTS

| 1,400,155 | A | * | 12/1921 | Greenburg | ..................... 40/663 |
| 2,244,975 | A | * | 6/1941 | Tinnerman | ..................... 411/352 |
| RE22,544 | E | * | 9/1944 | Tinnerman | ..................... 411/913 |
| RE22,618 | E | * | 3/1945 | Johnson | ..................... 411/913 |
| 2,619,145 | A | * | 11/1952 | Poupitch | ..................... 411/165 |
| 3,226,145 | A | * | 12/1965 | Goldberg | ..................... 411/913 |
| 3,304,562 | A | * | 2/1967 | Schmidt | ..................... 470/2 |
| 3,342,235 | A | * | 9/1967 | Pylypyshyn | ..................... 411/533 |
| 3,910,156 | A | * | 10/1975 | Soltysik | ..................... 411/913 |
| 4,430,033 | A | * | 2/1984 | McKewan | ..................... 411/180 |

(Continued)

FOREIGN PATENT DOCUMENTS

DE            29 02 053            8/1979

(Continued)

OTHER PUBLICATIONS

Examination Report issued by the Japanese Patent Office and English Language Translation.

(Continued)

*Primary Examiner*—James R. Brittain
*Assistant Examiner*—Ruth C. Rodriguez
(74) *Attorney, Agent, or Firm*—Buchanan Ingersoll & Rooney PC

(57) ABSTRACT

A spacer is disclosed which is made of a metal and interposed between opposed faces of two members having respective bores co-axial with each other and fastened to each other by inserting a fastening member into the bores and tightening the fastening member. The spacer includes a base interposed between the opposed faces of the members and having a through hole co-axial with the bores of the respective members so that the fastening member is inserted through the hole, and a temporarily retaining portion provided on an open edge of the hole of the base for temporarily retaining the overall spacer on one of the members before the members are fastened to each other, the temporarily retaining portion being inserted into the bore of the one member and caught on a wall defining the bore.

10 Claims, 19 Drawing Sheets

U.S. PATENT DOCUMENTS

| | | | | |
|---|---|---|---|---|
| 4,749,318 A | * | 6/1988 | Bredal | 411/508 |
| 4,925,351 A | * | 5/1990 | Fisher | 411/913 |
| 4,979,857 A | * | 12/1990 | Wing | 411/533 |
| 5,172,999 A | * | 12/1992 | Ijima et al. | 403/51 |
| 5,842,894 A | * | 12/1998 | Mehlberg | 411/533 |
| 6,095,733 A | * | 8/2000 | Busby et al. | 411/533 |
| 6,582,171 B2 | * | 6/2003 | Bondarowicz et al. | 411/353 |
| 6,811,347 B1 | * | 11/2004 | Hsieh | 403/300 |
| 2005/0220567 A1 | * | 10/2005 | Winker | 411/533 |

FOREIGN PATENT DOCUMENTS

| | | |
|---|---|---|
| GB | 2 012 904 | 8/1979 |
| JP | 3001969 U | 6/1994 |
| JP | 9-303440 | 11/1997 |
| JP | 2000-27904 A | 1/2000 |
| JP | 2002-295539 A | 10/2002 |

OTHER PUBLICATIONS

German Official Action and English language translation of German Official Action*.

* cited by examiner

SPACER SUITABLE FOR USE WITH DISK BRAKE INCLUDING CALIPER

BACKGROUND OF THE INVENTION

1. Field of the Invention

This invention relates to a spacer interposed between two members, and more particularly to a spacer interposed between a caliper and a steeling knuckle of a disk brake for vehicles.

2. Description of the Related Art

Disk brakes are known as a brake system of vehicles or the like. For example, JP-A-9-303440 discloses one of conventional disk brakes. FIG. 18 illustrates one of the conventional disk brakes and FIG. 19 illustrates a spacer used in the disk brake. The shown disk brake comprises a caliper 1 accommodating brake pads and a brake disk 9 against which the brake pads are pressed at opposed sides so as to slidingly hold the disk therebetween, whereby a braking force is effected. The caliper 1 has a mounting bore and a steeling knuckle 4 provided at the vehicle side also has a mounting bore co-axial with the bore of the caliper. A bolt 3 is screwed into the mounting bores of the caliper 1 and steeling knuckle 4 so that the caliper is mounted on the steeling knuckle. Either one of the caliper 1 and the steeling knuckle 4 is made of a metallic material, whereas the other is made of an aluminum material. Accordingly, connected portions of the caliper 1 and steeling knuckle 4 are corroded by the electrochemical reaction. For the purpose of preventing the corrosion, a spacer 5 serving as an electrolytic corrosion preventing member is interposed between the caliper 1 and the steeling knuckle 4.

The spacer 5 comprises a generally ring-shaped body 6 having two claws 7 and a temporarily retaining portion 8 formed on a outer peripheral edge of the body. The caliper 1 includes a mounting portion 10 to which the body 6 of the spacer 5 is mounted. The mounting portion 10 is held between the claws 7, and a distal end of the temporarily retaining portion 8 is caught on an engagement face 2 of the caliper 1 so that the caliper is held between the body 6 and the temporarily retaining portion, whereby the spacer is temporarily retained on the caliper. Subsequently, the bolt 3 is inserted into the mounting holes of the caliper 1 and steeling knuckle 4 and tightened up so that the caliper and the steeling knuckle are tightened against the spacer.

In the above-described spacer 5, however, the claw 7 and temporarily retaining portion 8 are exposed outside. Accordingly, foreign matter tends to be brought into contact with the claw 7 and the temporarily retaining portion 8 when the spacer 5 is temporarily retained on the caliper 1. As a result, the foreign matter sometimes releases the spacer 5 from the temporarily retained state or deforms the claw 7 and the temporarily retaining portion 8.

Furthermore, the claw 7 and the temporarily retaining portion 8 are formed on the outer peripheral edge of the body 6. This renders a developed form of the spacer 5 large and accordingly reduces the material yield.

Additionally, in order that the spacer 5 may be mounted to the caliper 5, the body 6 of the spacer 5 is placed opposite the mounting portion 10 of the caliper 1. In this state, the claw 7 is caused to engage the mounting portion 10 while the body 6 is pulled downward so that the temporarily retaining portion 8 is kept opened. Subsequently, the temporarily retaining portion 8 is pressed against the surface of the caliper 1 so as to be engaged with the engagement face 2. Thus, the mounting work is troublesome. Accordingly, the mounting of the spacer 5 cannot easily be automatized.

SUMMARY OF THE INVENTION

Therefore, an object of the present invention is to provide a spacer which can reliably be held in the temporarily retained state and has an improved material yield.

The present invention provides a spacer made of a metal and interposed between opposed faces of two members having respective bores co-axial with each other and fastened to each other by inserting a fastening member into the bores and tightening the fastening member, the spacer comprising a base interposed between the opposed faces of the members and having a through hole co-axial with the bores of the respective members so that the fastening member is inserted through the hole, and a temporarily retaining portion provided on an open edge of the hole of the base for temporarily retaining the overall spacer on one of the members before the members are fastened to each other, the temporarily retaining portion being inserted into the bore of said one member and caught on a wall defining the bore.

The above-described spacer is firstly temporarily retained on a first one of the members. In this case, when inserted into the bore of the first member, the temporarily retaining portion is flexed to elastically engage the inner wall of the bore of the first member, whereby the spacer is temporarily retained on the first member.

Suppose now the case where a central axis of the through hole of the spacer is slightly deviated from central axes of the bores when the temporarily retaining portion has been inserted in the bore of the first member. Even in this case, an edge of the temporarily retaining portion slides on the open edge of the bore of the first member. Consequently, the temporarily retaining portion can smoothly be inserted into the bore of the first member.

After the spacer has completely been mounted to the first member for the temporary retainment, the other or second member is placed on the first member with the spacer and then, the mounting member is inserted through the bore of the second member and the hole of the spacer into the bore of the first member, whereupon the three members are fixed together.

Since the temporarily retaining portion of the spacer is formed on the open edge of the spacer, it is located inside the bore of the first member when the spacer has temporarily been retained on the first member. Consequently, foreign matter can be prevented from coming into contact with the temporarily retaining portion as compared with the conventional spacer with the externally exposed temporarily retaining portion. Accordingly, the spacer can be prevented from being released from the temporarily retained state and the temporarily retaining portion can be prevented from being deformed.

Furthermore, since the temporarily retaining portion is provided on the open edge of the hole of the spacer, the material yield can be improved in the foregoing spacer as compared with the conventional spacer in which the temporarily retaining portion is provided on the outer peripheral edge of the base thereof. Additionally, since the spacer is easily fastened to the first member when the temporarily retaining portion is just inserted into the bore of the first member. Thus, the spacer mounting work can be automatized easily.

In one preferred form, the temporarily retaining portion has a falling-off preventing claw formed thereon by cutting a part thereof and raising the cut part, so as to be engaged with the wall of the bore of said one member. The temporarily retaining portion elastically contacts the open edge of the bore of the first member when having been inserted into the hole. With this, the falling-off preventing claw engages the inner wall of the bore of the first member. Consequently, the temporarily retaining portion can further be prevented from falling off in a disengaging direction.

BRIEF DESCRIPTION OF THE DRAWINGS

Other objects, features and advantages of the present invention will become clear upon reviewing the following description of the embodiment, made with reference to the accompanying drawings, in which.

DETAILED DESCRIPTION OF THE INVENTION

Figure 1:
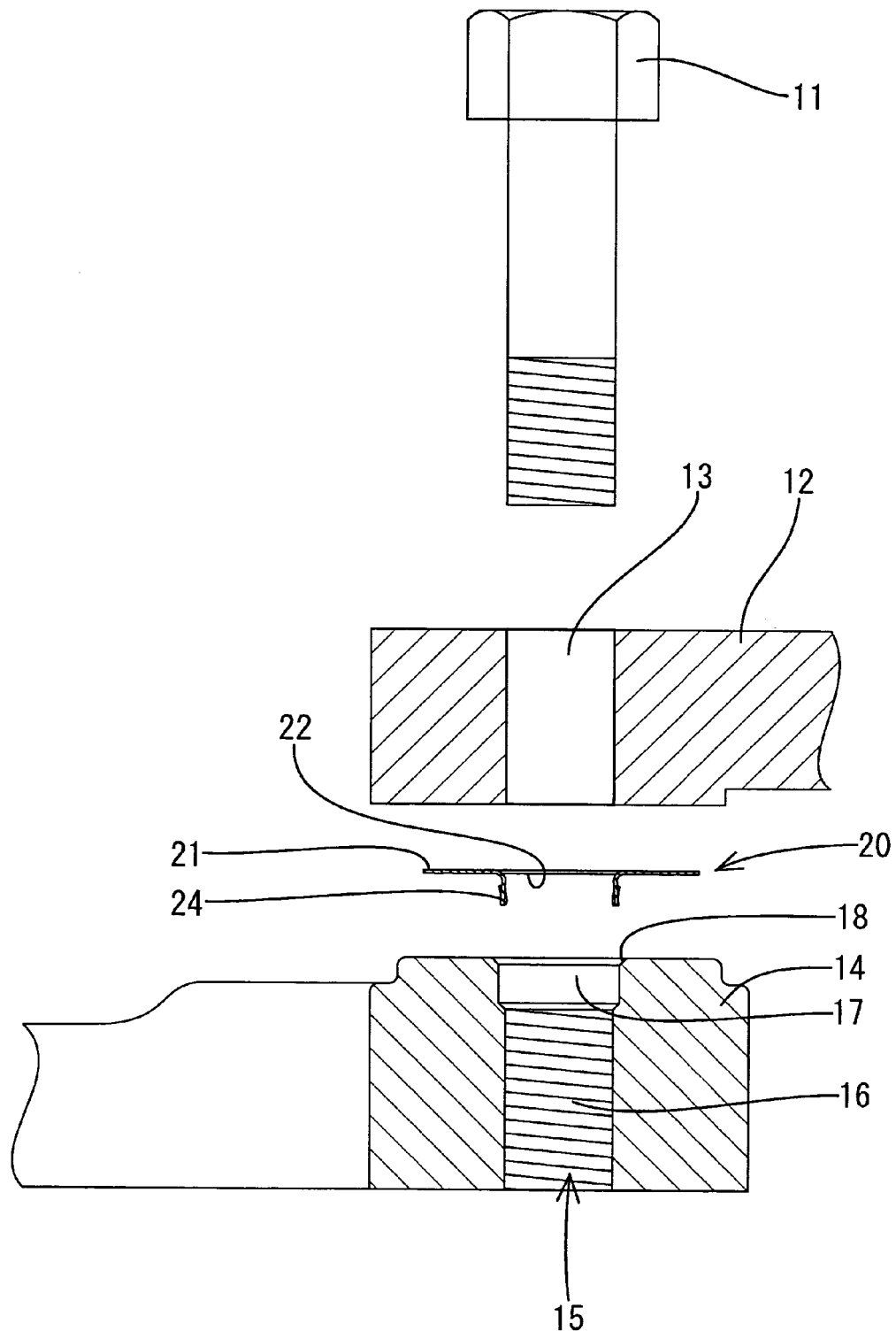
FIG. 1 is an exploded sectional view of a caliper, a steeling knuckle, a bolt and the spacer in accordance with an embodiment of the present invention.
Figure 2:
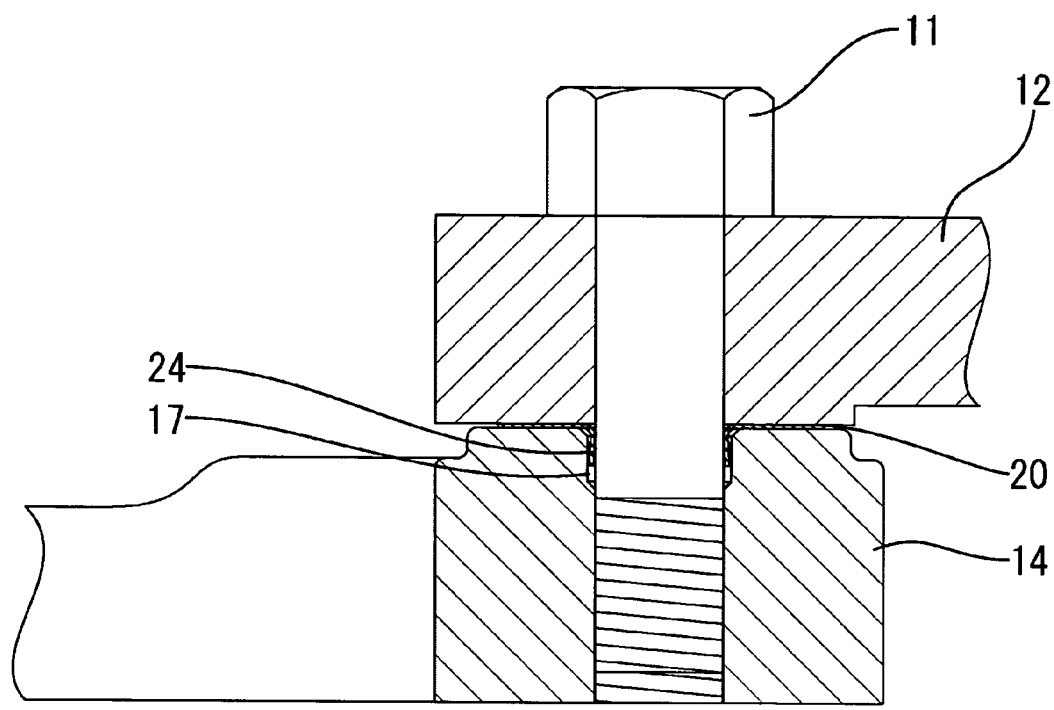
FIG. 2 is a sectional view of the steeling knuckle, spacer and caliper in the assembled state.
Figure 18:
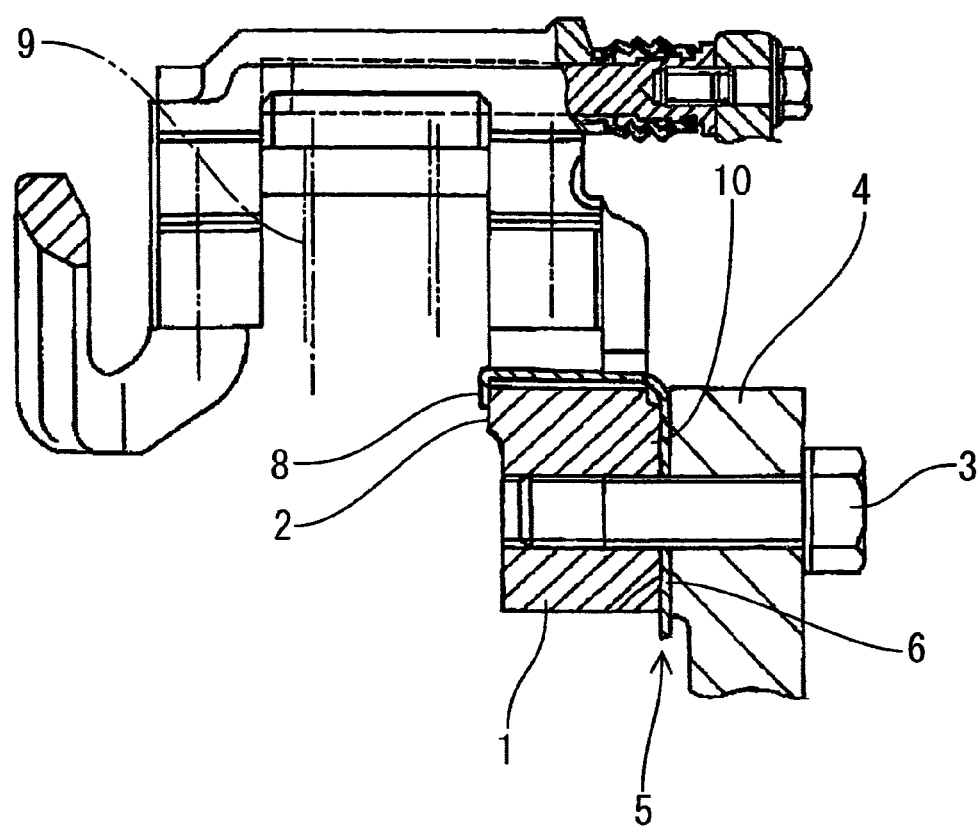
FIG. 18 is a partial sectional view of a conventional disk brake.
Figure 19:
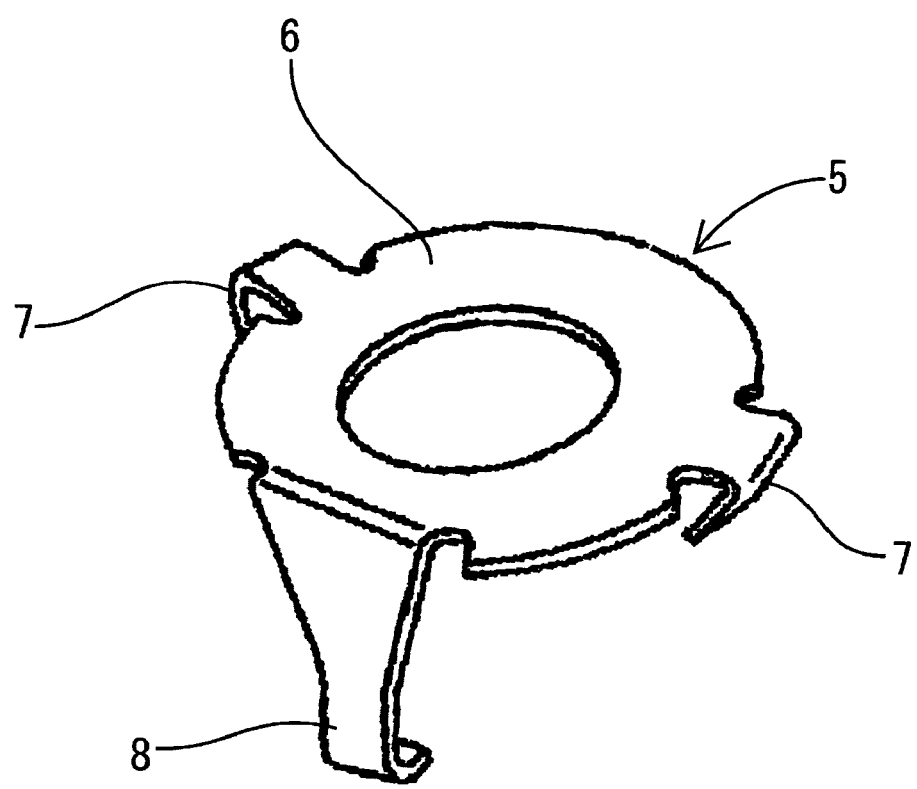
FIG. 19 is a perspective view of a conventional spacer.

An embodiment of the present invention will be described with reference to FIGS. 1 to 7. A spacer 20 in accordance with the embodiment is applied to the disk brake of a vehicle, for example, an automobile. The disk brake has the same construction as described with reference to FIG. 18. Referring to FIGS. 1 and 2, the disk brake includes a disk rotated with wheels of the automobile. The disk is fastened by brake pads pressed by pistons, so that a braking force is effected.

Principal components such as the disk and pistons are accommodated in a caliper 14 serving as a first member. The caliper 14 is made of a material containing aluminum and mounted on a steeling knuckle 12 which is a non-rotating portion of the automobile. The steeling knuckle 12 is made of a material containing iron and serves as a second member. The caliper 14 is mounted on the steeling knuckle 12 by a bolt 11 serving as a fastening member.

Referring to FIGS. 1 and 2, the steeling knuckle 12 has a through bore 13 through which the bolt 11 is inserted. The caliper 14 also has a through bore 15 which is co-axial with the bore 13 of the steeling knuckle 12 when the steeling knuckle has been fastened to the caliper. The bore 15 includes an on-threaded portion 17 having no thread and a threaded portion 16 located below the non-threaded portion and having a thread. The non-threaded portion 17 has a slightly larger diameter than the threaded portion 16. The non-threaded portion 17 has a reverse tapered open end.

A spacer 20 in accordance with the embodiment of the invention is interposed between the caliper 14 and the steeling knuckle 12. The spacer 20 is made of mild steel, a metallic material for a spring or the like and has a surface to which an insulating coating is applied. The spacer 20 includes a generally disk-shaped base 21 and a temporarily retaining portion 24 for temporarily retaining the overall spacer 20 on the caliper 14, as shown in FIGS. 3 to 7. The base 21 has a central through hole 22 which has a diameter equal to or slightly larger than the non-threaded portion 17 of the bore 15. The bolt 11 is allowed to be inserted through the bore 13, the hole 22 and the bore 15 sequentially when the spacer 20 is interposed between the steeling knuckle 12 and the caliper 14.

Figure 3:
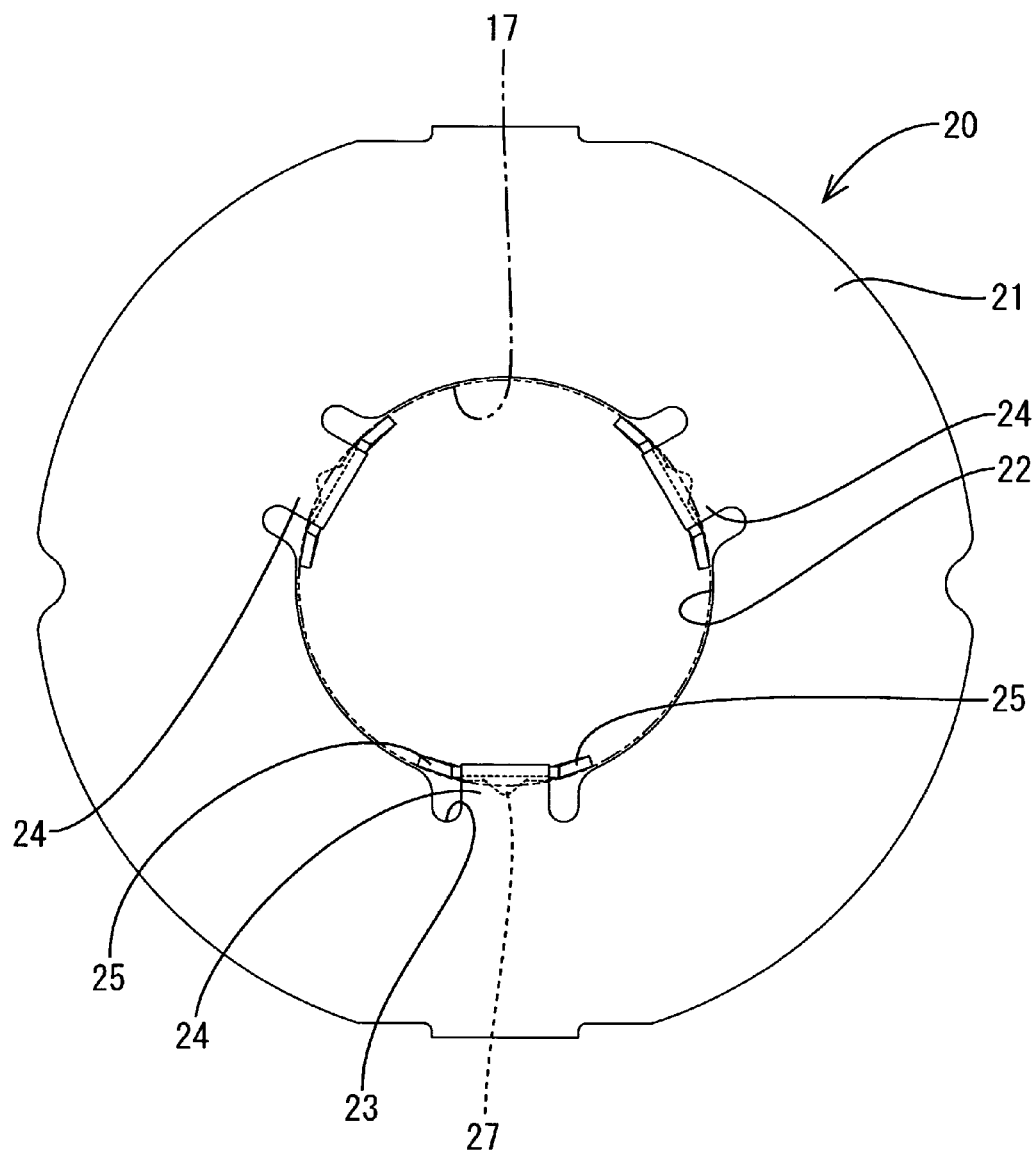
FIG. 3 is a plan view of the spacer.
Figure 4:
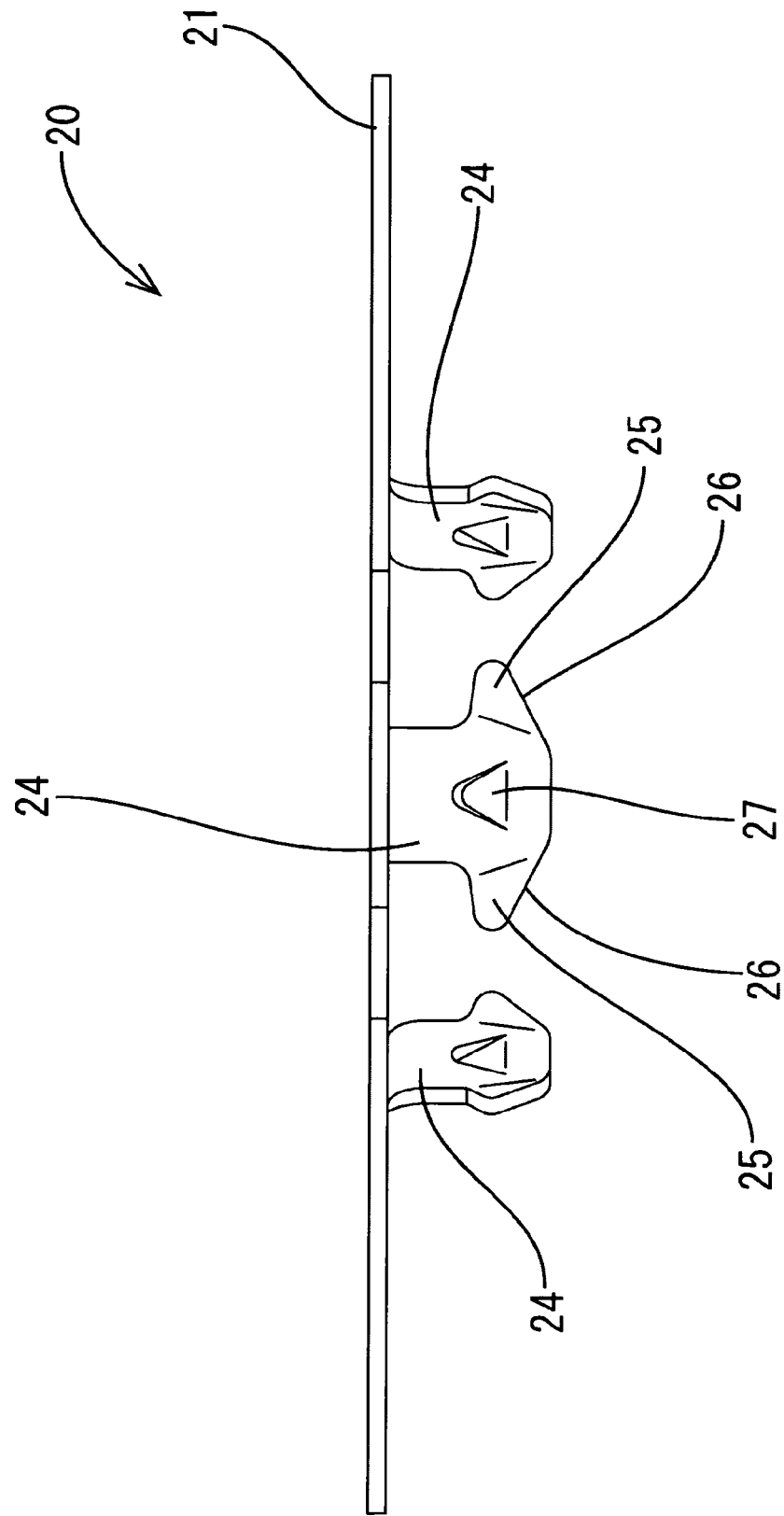
FIG. 4 is a side view of the spacer.

The temporarily retaining portion 24 will now be described. Three temporarily retaining portions 24 are provided at regular intervals on the open edge of the hole 22 as shown in FIGS. 3 and 4. Each temporarily retaining portion 24 is bent at the open edge of the hole 22 toward the caliper 14 side into a generally L-shape and is flexible radially. Each temporarily retaining portion 24 flexibly contacts a circumferential wall defining the non-threaded portion 17 of the bore 15 as will be described later. However, the temporarily retaining portion 24 is formed so as not to be brought into contact with the bolt 11 when the bolt is inserted through bore 13, the hole 22 and the bore 15 sequentially.

Figure 5:
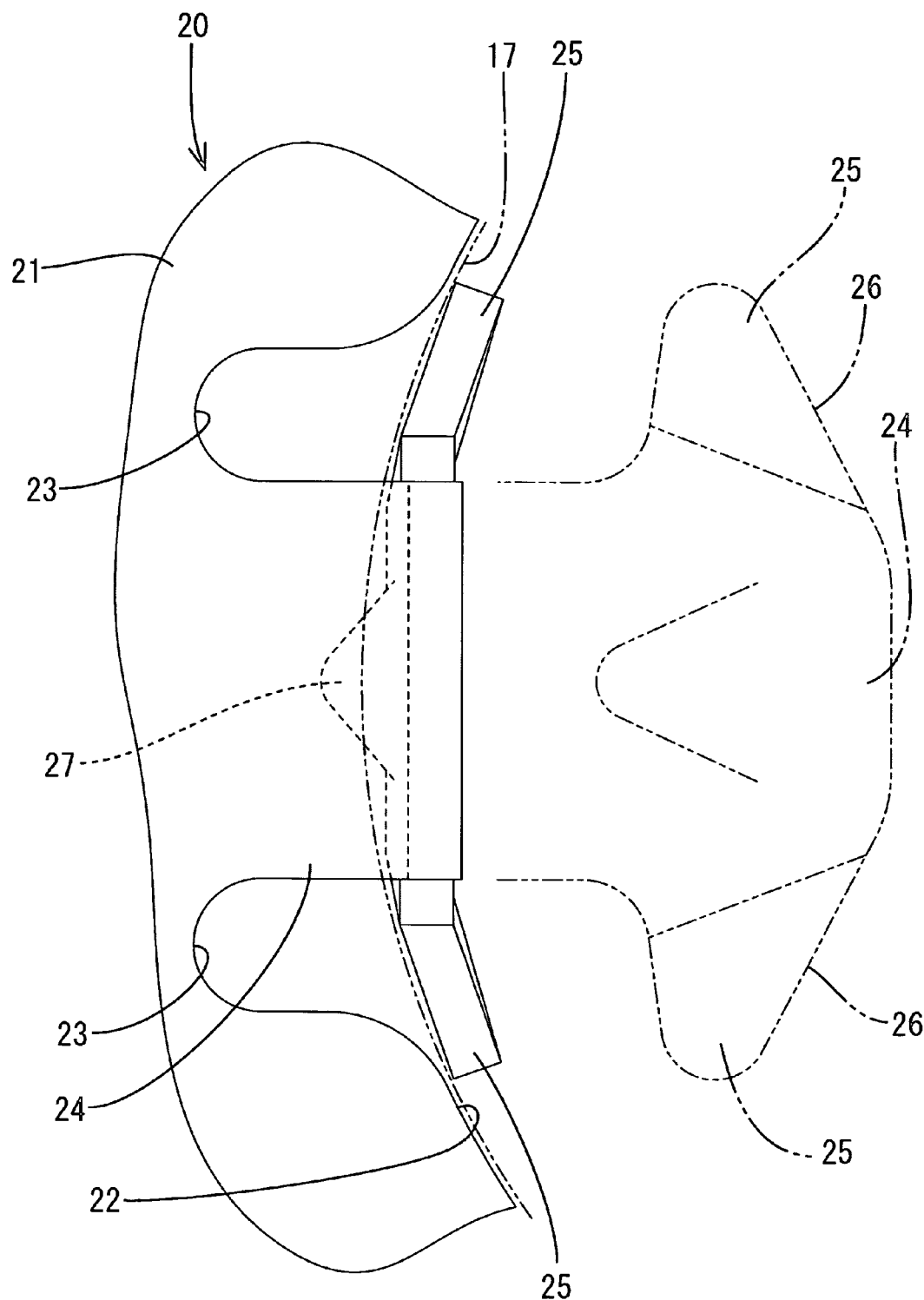
FIG. 5 is a plan view of the temporarily retaining portion, showing a developed form and bent state.
Figure 6:
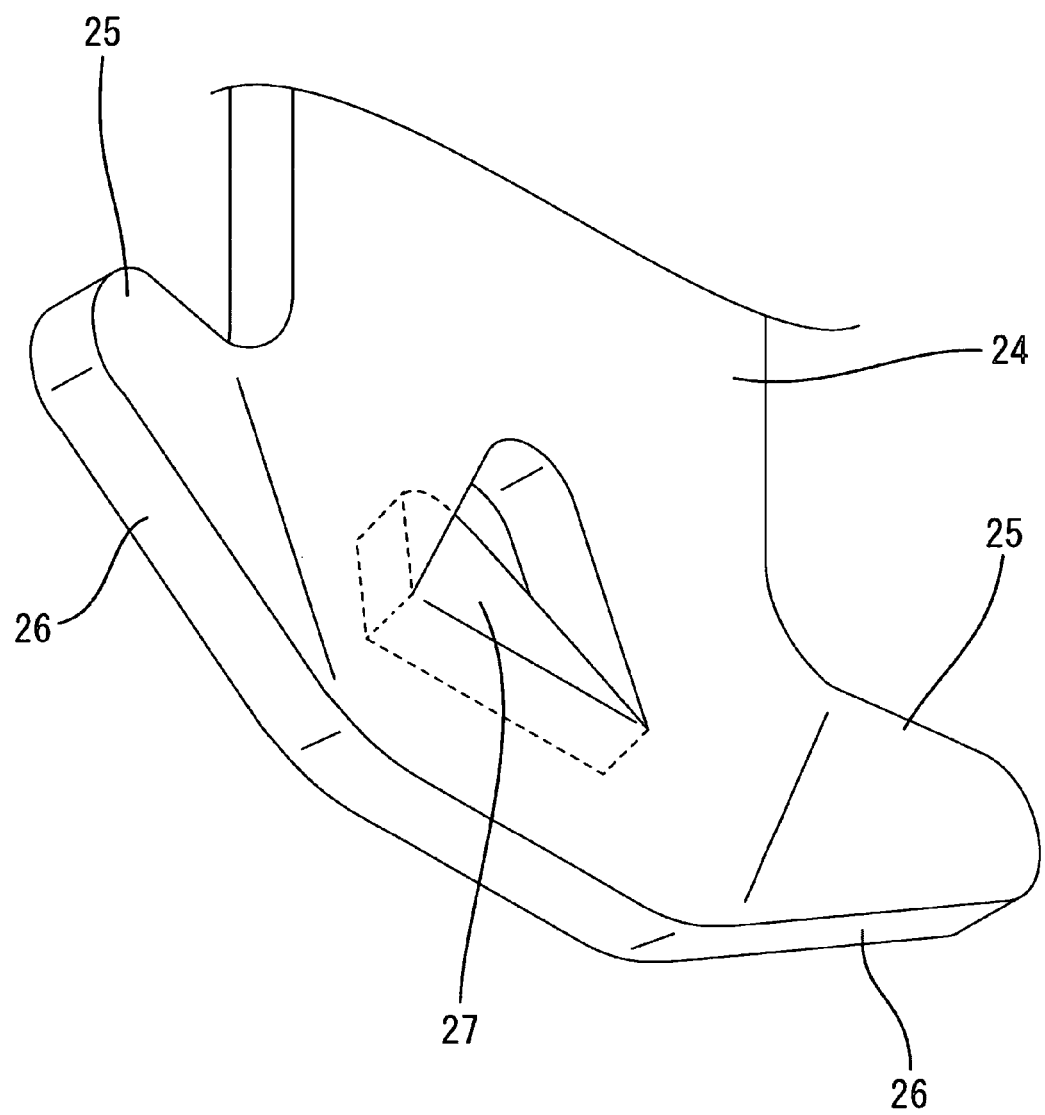
FIG. 6 is an enlarged perspective view of the temporarily retaining portion.
Figure 7:
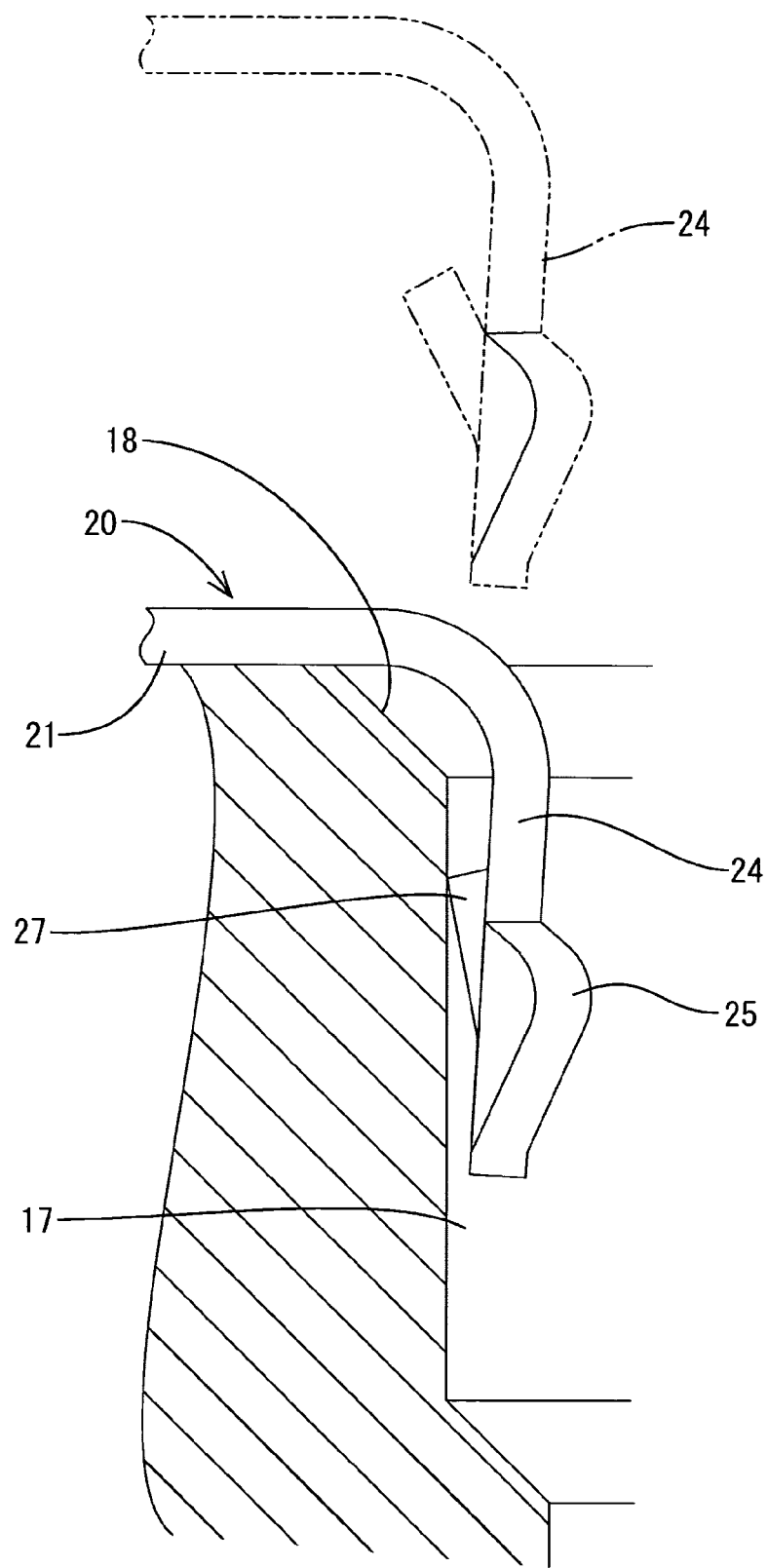
FIG. 7 is a sectional view showing the temporarily retaining portion inserted in a non-threaded portion.
Figure 8:
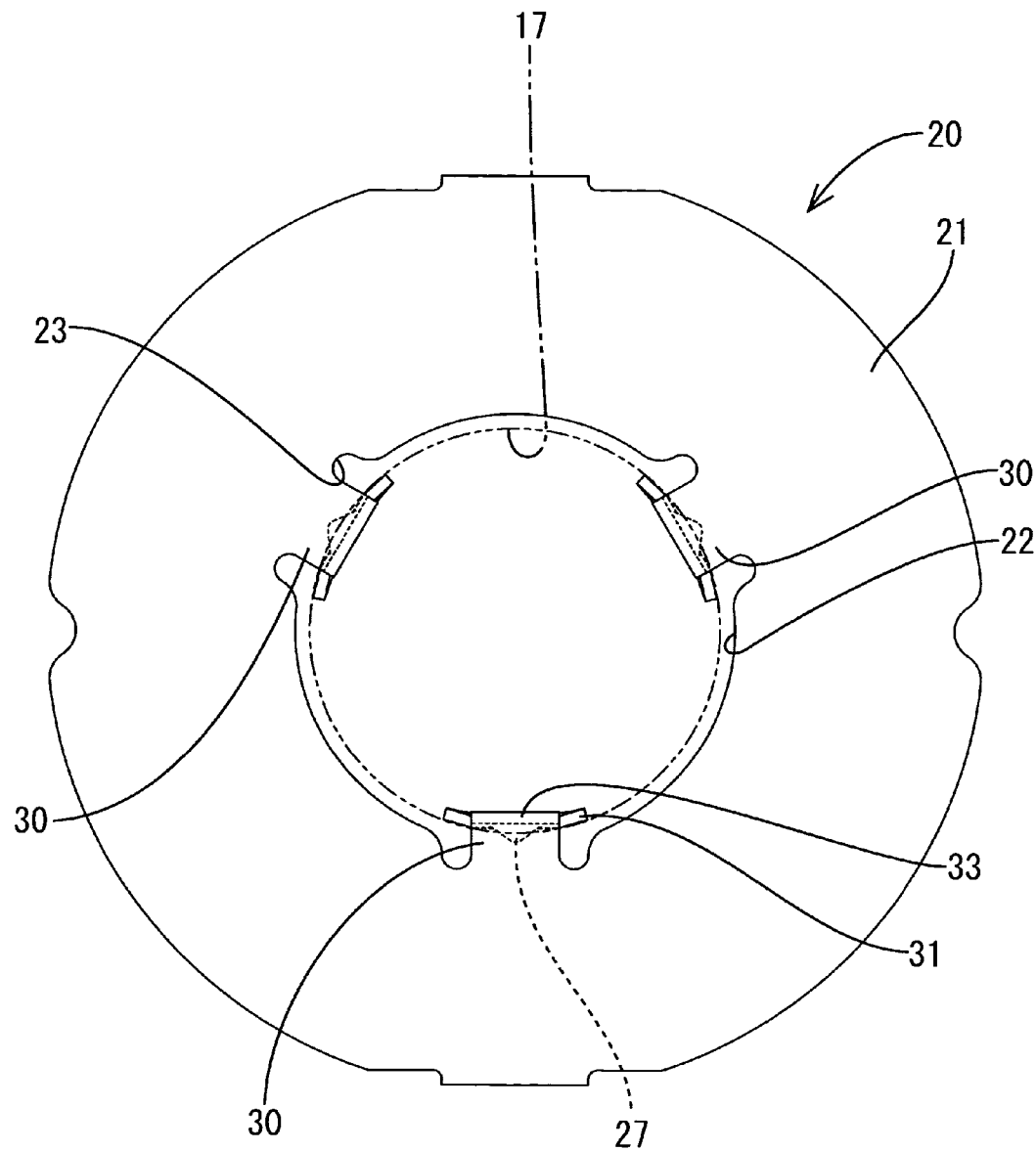
FIG. 8 is a plan view of the spacer in accordance with a second embodiment of the invention.

Each temporarily retaining portion 24 includes a root portion and two slits 23 formed in both sides of the root portion so as to extend radially outward with respect to the base 21, respectively, as shown in FIG. 3. The slits 23 serve to enhance the flexibility of each temporarily retaining portion 24. In bending each temporarily retaining portion 24, the root portion thereof is firstly caused to project horizontally from the base 21 as shown in FIG. 5 and thereafter bent substantially vertically. Furthermore, each temporarily retaining portion 24 has a pair of projections 25 formed on respective opposite sides of a distal end thereof so that the projections extend symmetrically generally in a circumferential direction of the hole 22, as shown in FIGS. 4 to 7. Each projection 25 has two tapered guide edges formed on both side edges of a distal end thereof respectively. As a result, each temporarily retaining portion 24 is generally formed into the shape of a tapered arrowhead. Consequently, even when a central axis of the hole 22 is slightly deviated from a central axis of the non-threaded portion 17 in insertion of each temporarily retaining portion 24 into the non-threaded portion, the guide edges 26 are brought into a sliding contact with the open edge of non-threaded portion 17 or the tapered portion 18, whereby each temporarily retaining portion 24 is self-aligned. Consequently, each temporarily retaining portion 24 can smoothly be inserted into the non-threaded portion 17. Additionally, each projection 25 is flexibly contacted with the inner circumferential wall of the non-threaded portion 17 along the curved wall surface.

Each temporarily retaining portion 24 has a generally triangular falling-off preventing claw 27 formed in a width wise central portion thereof. Each falling-off preventing claw 27 is formed by cutting a part of each temporarily retaining portion 24 and raising the cut part outward into a cantilevered shape. Accordingly, each temporarily retaining portion 24 has an end at the side toward which the retainer comes out of the non-threaded portion 17 of the bore 15. The end serves as a flexible free end. The free end is adapted to abut the inner circumferential wall of the non-threaded portion 17 when each temporarily retaining portion 24 is inserted into the non-threaded portion. Furthermore, a distal end of the free end is pointed so that each temporarily retaining portion is enhanced to bite into the inner circumferential wall of the non-threaded portion.

In order that the spacer 20 may be temporarily retained on the caliper 14, each temporarily retaining portion 24 is thrust into the non-threaded portion 17 until it reaches a position where the base 21 adheres closely to the outer face of the caliper 14, as shown in FIG. 2.

After insertion of the temporarily retaining portions 24, the projections 25 elastically contacts the inner circumferential wall of the non-threaded portion 17, and the falling-off preventing claws 27 engage the wall so as to bite into the wall. As a result, the spacer 20 is temporarily held on the caliper 14 and prevented from easily falling off.

Subsequently, the bolt 11 is inserted into the bore 13, the hole 22 and the bore 15 sequentially and tightened up while the spacer 20 is in abutment with the steeling knuckle 12, whereby the fixing of the steeling knuckle 12, spacer 20 and caliper 14 is completed.

In the above-described embodiment, the spacer 20 renders the temporary holding on the caliper 14 reliable, and the temporarily retaining portions 24 are formed on the open edge of the hole 22 of the base 21 and engage the inner circumferential wall in the non-threaded portion 17. Thus, since the temporarily retaining portions 24 are not exposed externally, foreign matter can be prevented from coming into contact with the temporarily retaining portions 24 as compared with the conventional spacer with the externally exposed temporarily retaining portion. Consequently, the spacer 20 can be prevented from an inadvertent release from the temporarily held state, and the temporarily retaining portion 24 can be prevented from deformation.

Furthermore, since the temporarily retaining portions 24 are formed on the open edge of the hole 22, the developed form of the spacer 20 can be rendered smaller and accordingly, the material yield can be improved as compared with the case where the temporarily retaining portions 24 are provided on the outer peripheral edge of the base 21.

FIGS. 8 to 12 illustrate a second embodiment of the invention. In the above-described first embodiment, the guide edge 26 which is a guiding structure is formed at the stage where the temporarily retaining portion 24 is stamped out. In the second embodiment, however, the guiding structure is formed at a bending step after the stamping.

More specifically, in the first embodiment, the distal end of each projection 25 is cut into a tapered shape so that the guide edge 26 is formed when the temporarily retaining portion is in the developed form in the stamping. Accordingly, the temporarily retaining portion 24 is formed generally into the shape of an arrowhead.

On the other hand, in the second embodiment, the distal edges of both projections 31 extend from the distal edge of a main part 33 of the temporarily retaining portion 30 so as to be co-planar with the distal edge of the main part. In other words, the distal end of the temporarily retaining portion 30 is extended horizontally but not tapered.

Figure 9:
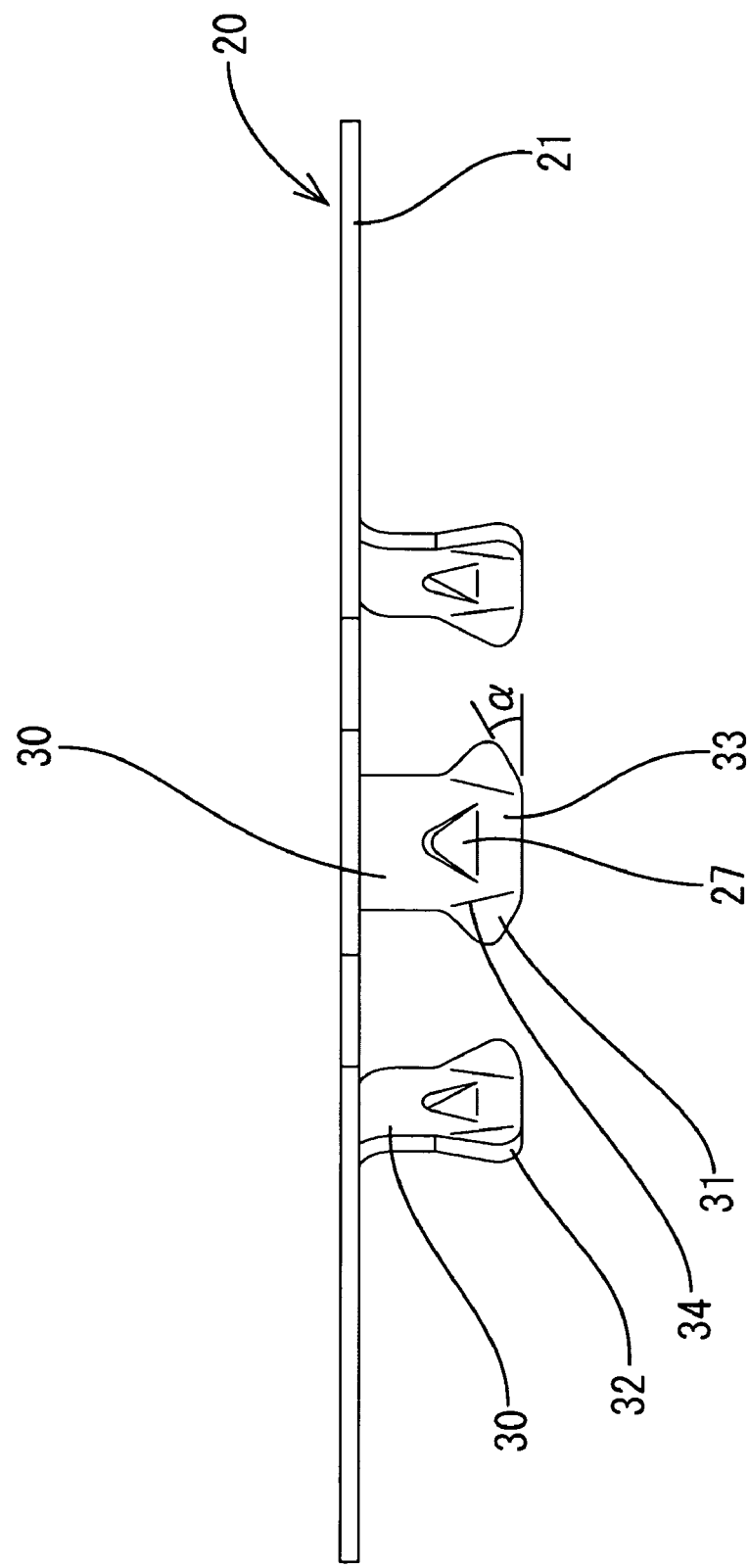
FIG. 9 is a side view of the spacer.
Figure 10:
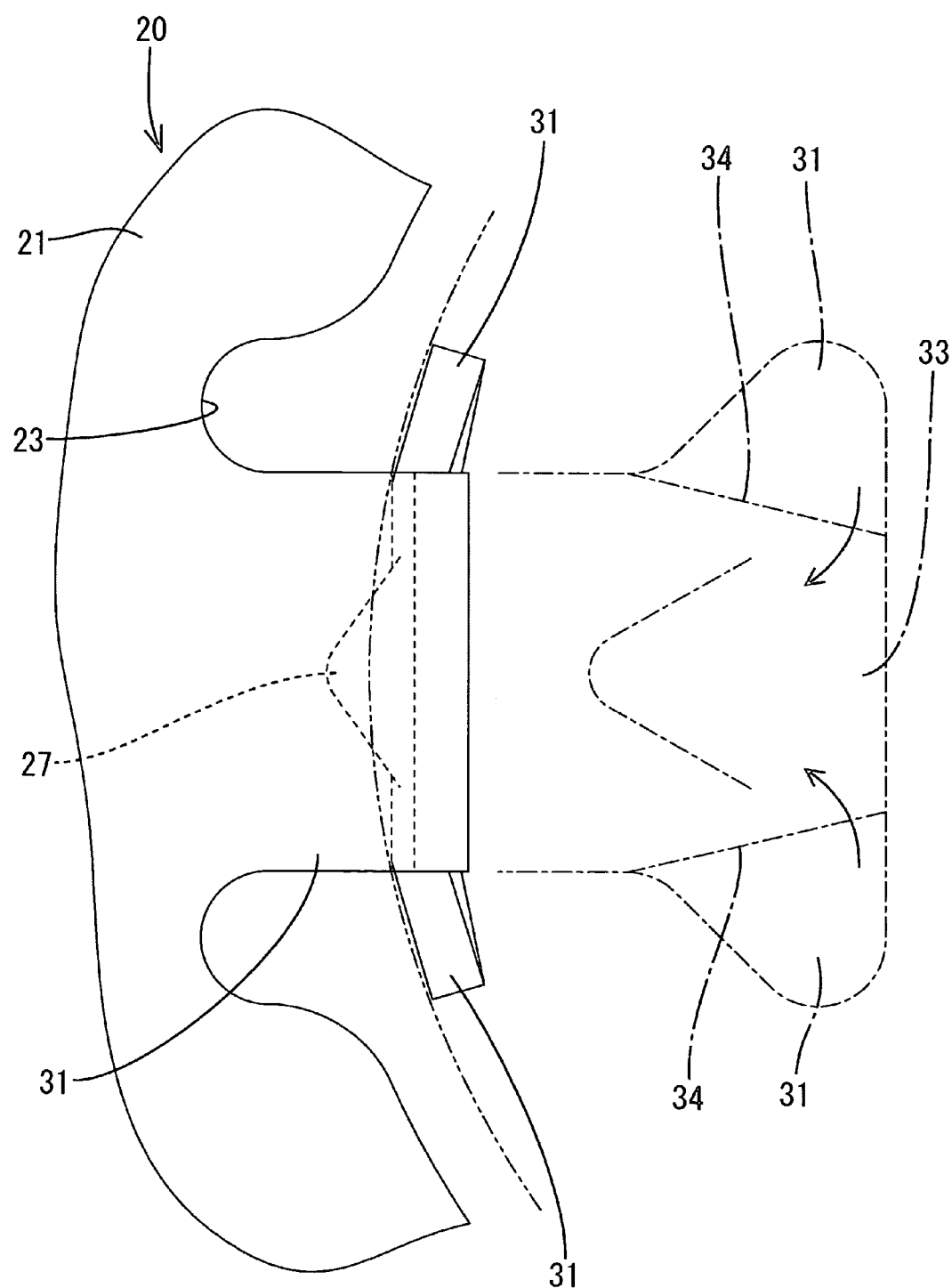
FIG. 10 is a plan view of the temporarily retaining portion, showing a developed form and bent state.
Figure 11:
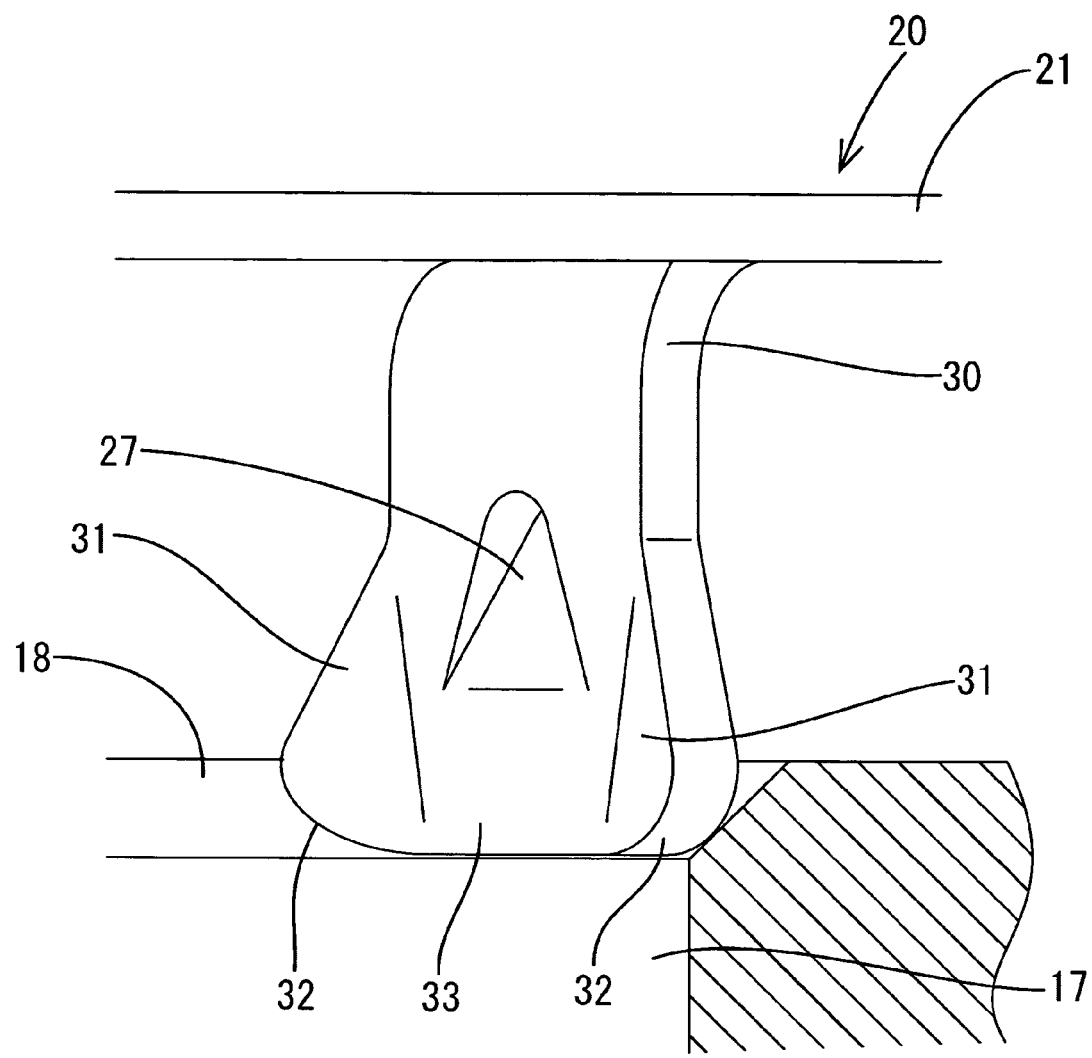
FIG. 11 illustrates the guide edge of the temporarily retaining portion in the sliding contact with the tapered face of the non-threaded portion.
Figure 12:
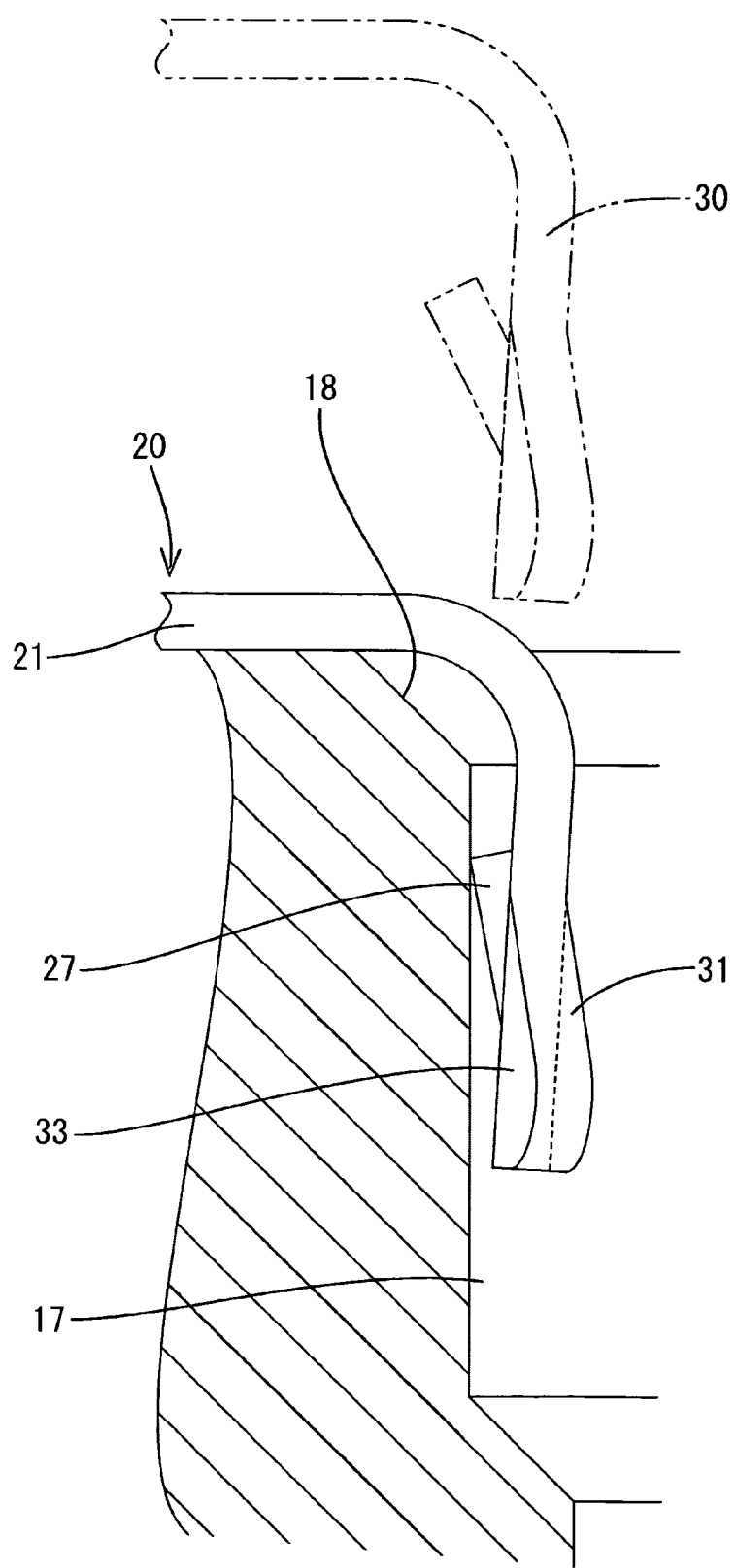
FIG. 12 is a sectional view showing the temporarily retaining portion inserted in a non-threaded portion.
Figure 13:
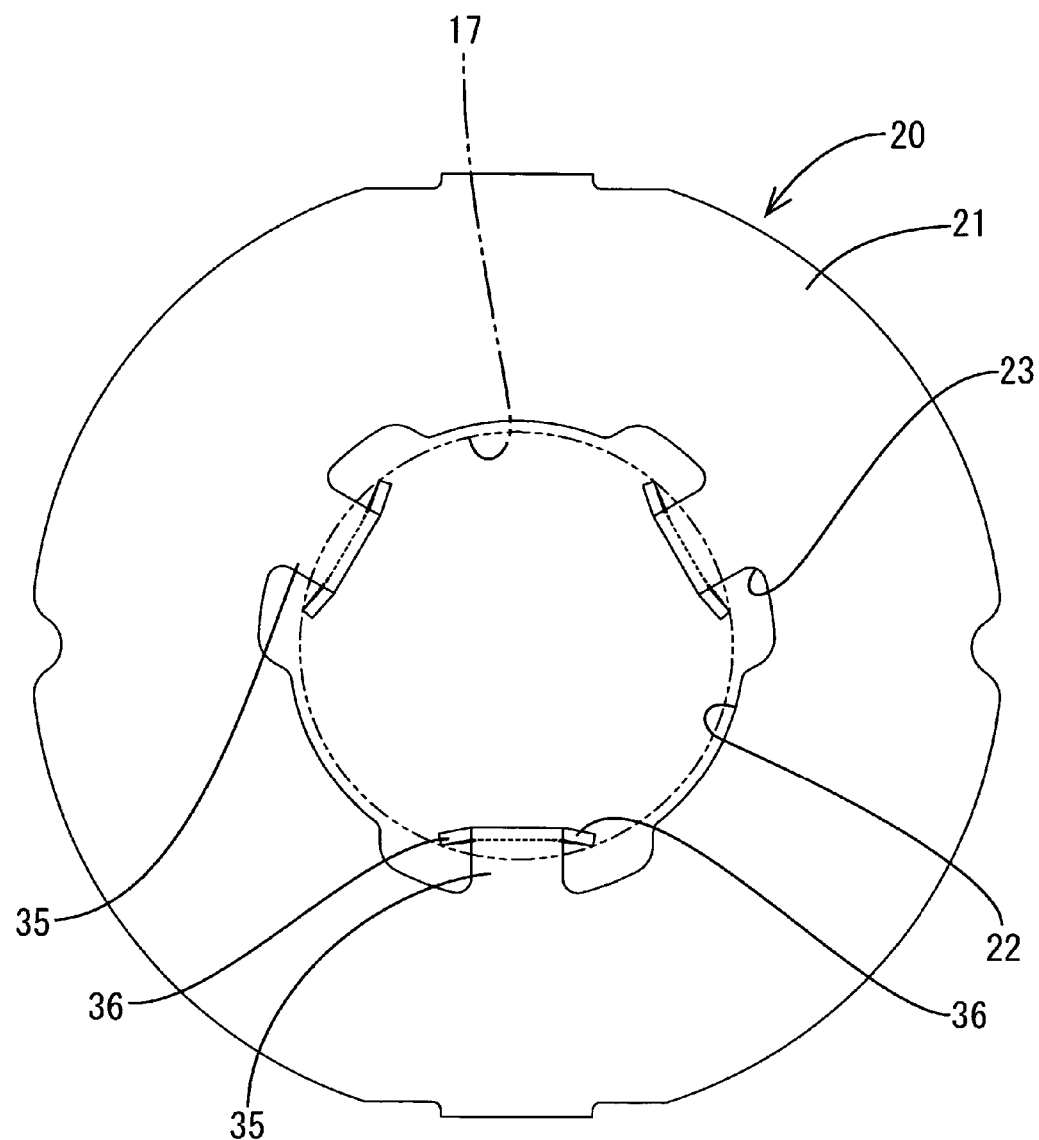
FIG. 13 is a plan view of the spacer in accordance with a third embodiment of the invention.
Figure 14:
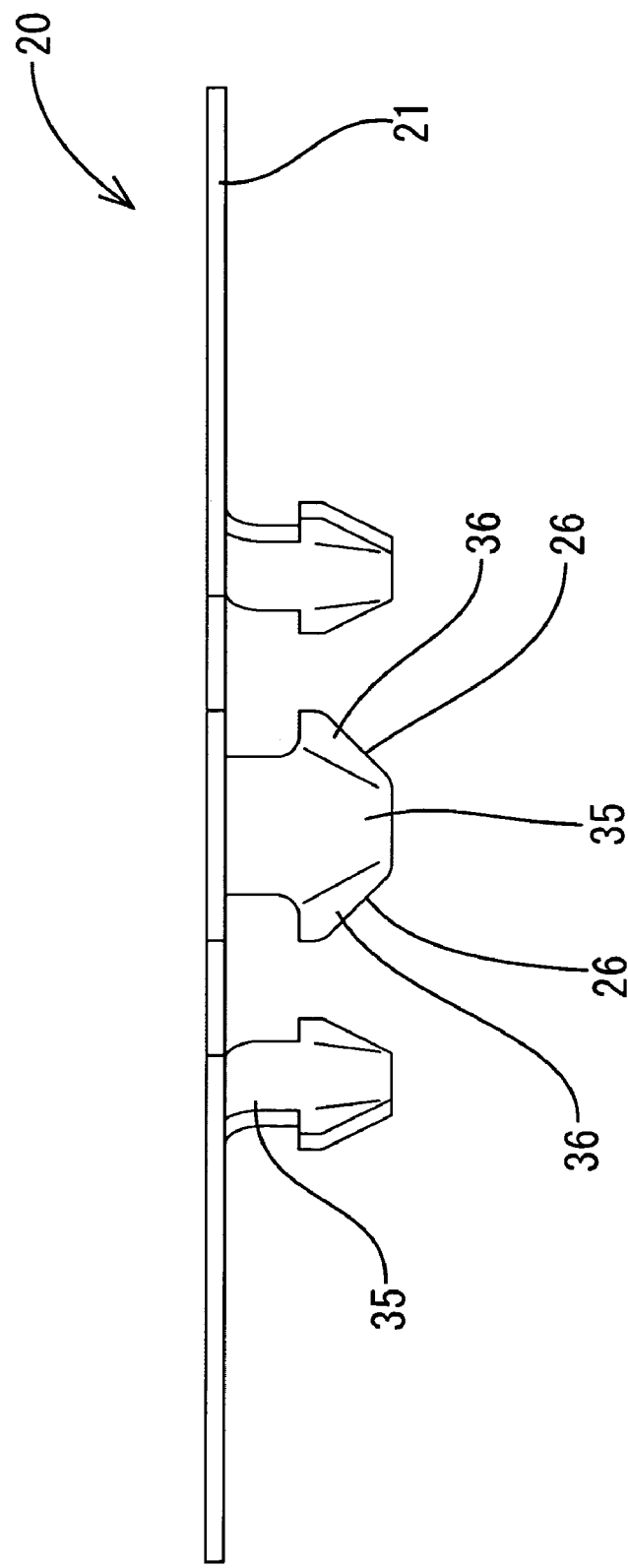
FIG. 14 is side view of the spacer.

However, when both projections 31 are bent inward along an inclined bending edge 34, the level of the distal edges of both projections 31 is higher than the level of the distal edge of the main part 33 as shown in FIGS. 9 and 11. Furthermore, the distal edge of each projection 31 is continuous to the distal edge of the main part 33 at an angle $\alpha$ as shown in FIG. 9. Thus, the distal edge of each projection 31 can serve as the guide edge 32 in the case where the temporarily retaining portion 30 is inserted into the non-threaded portion 17 of the bore.

Furthermore, since the guide edge 32 is formed by bending the projection 31, the strength of each projection 31 can be improved as compared with the case where the distal edge of each projection 25 is cut into the tapered shape as in the first embodiment.

The other structure of the spacer in the second embodiment is the same as that in the first embodiment and accordingly, the same effect can be achieved from the second embodiment as from the first embodiment. Accordingly, the description of the other structure is eliminated.

FIGS. 13 to 17 illustrate a third embodiment of the invention. The falling-off preventing claws 27 are eliminated in the third embodiment although provided in the first and second embodiments. The projections 36 of each temporarily retaining portion 35 are bent radially outward at the root portions of the projections. When each temporarily retaining portion 35 is inserted into the non-threaded portion 17, the edge of a side edge corner 37 of each projection 36 abuts the inner circumferential wall of the non-threaded portion 17.

Figure 15:
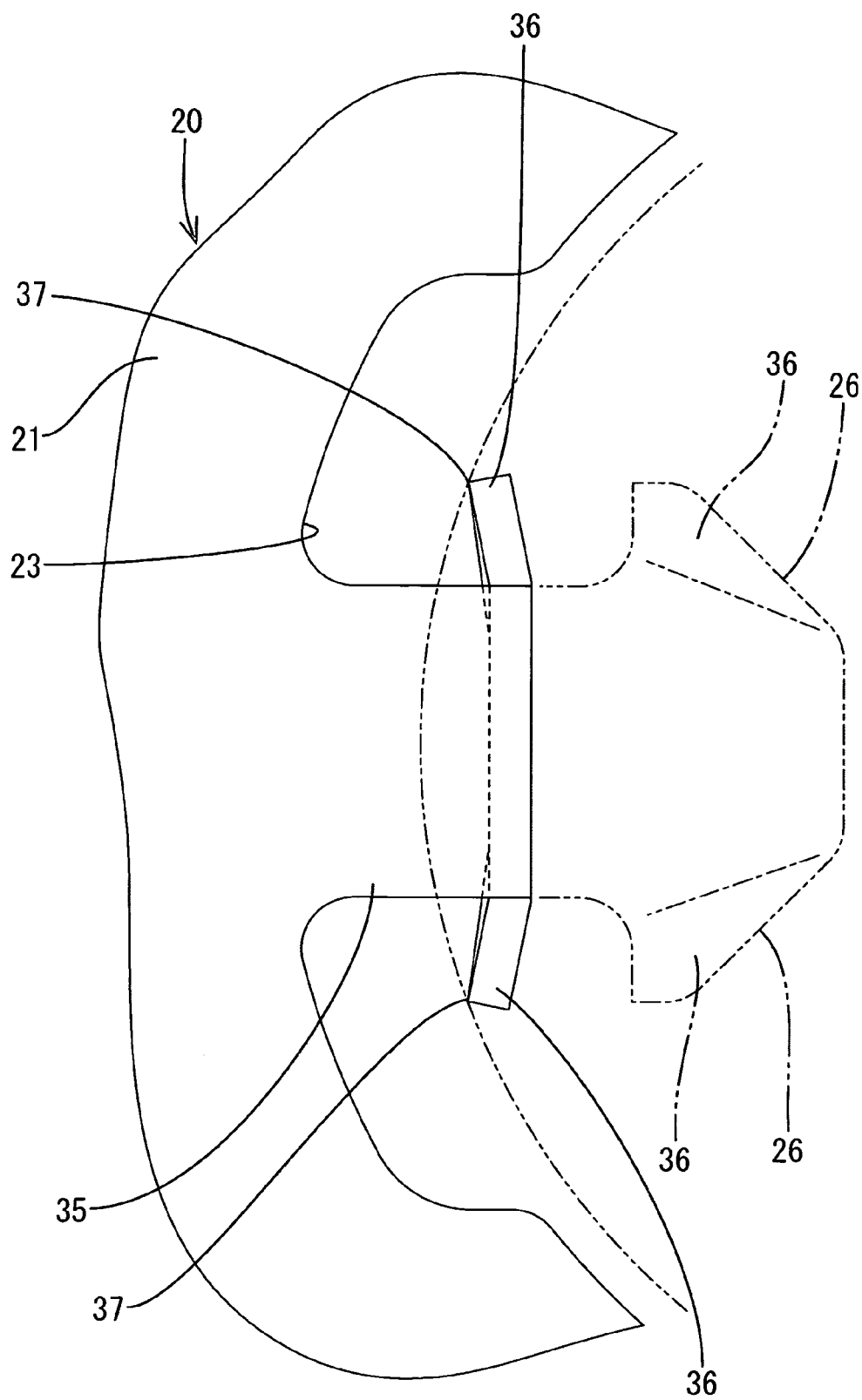
FIG. 15 is a plan view of the temporarily retaining portion, showing a developed form and bent state.
Figure 16:
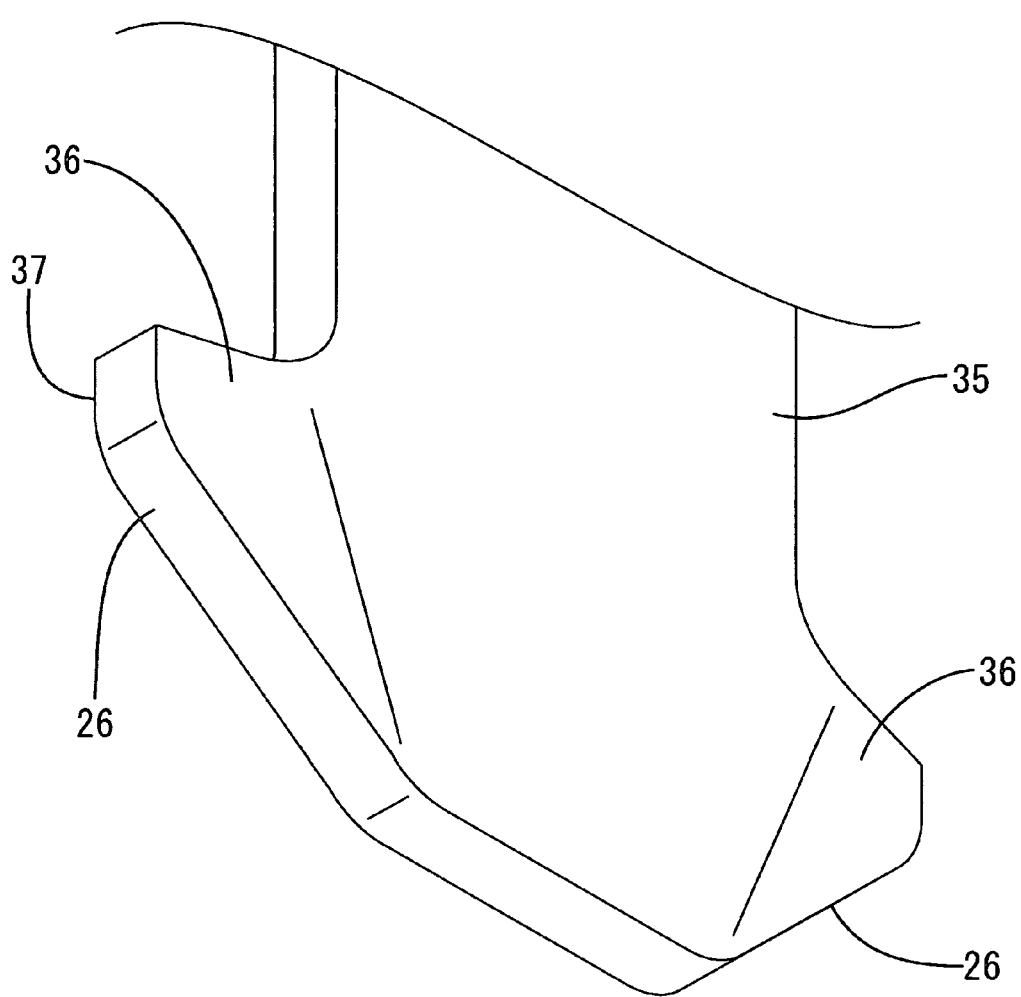
FIG. 16 is an enlarged perspective view of the temporarily retaining portion.
Figure 17:
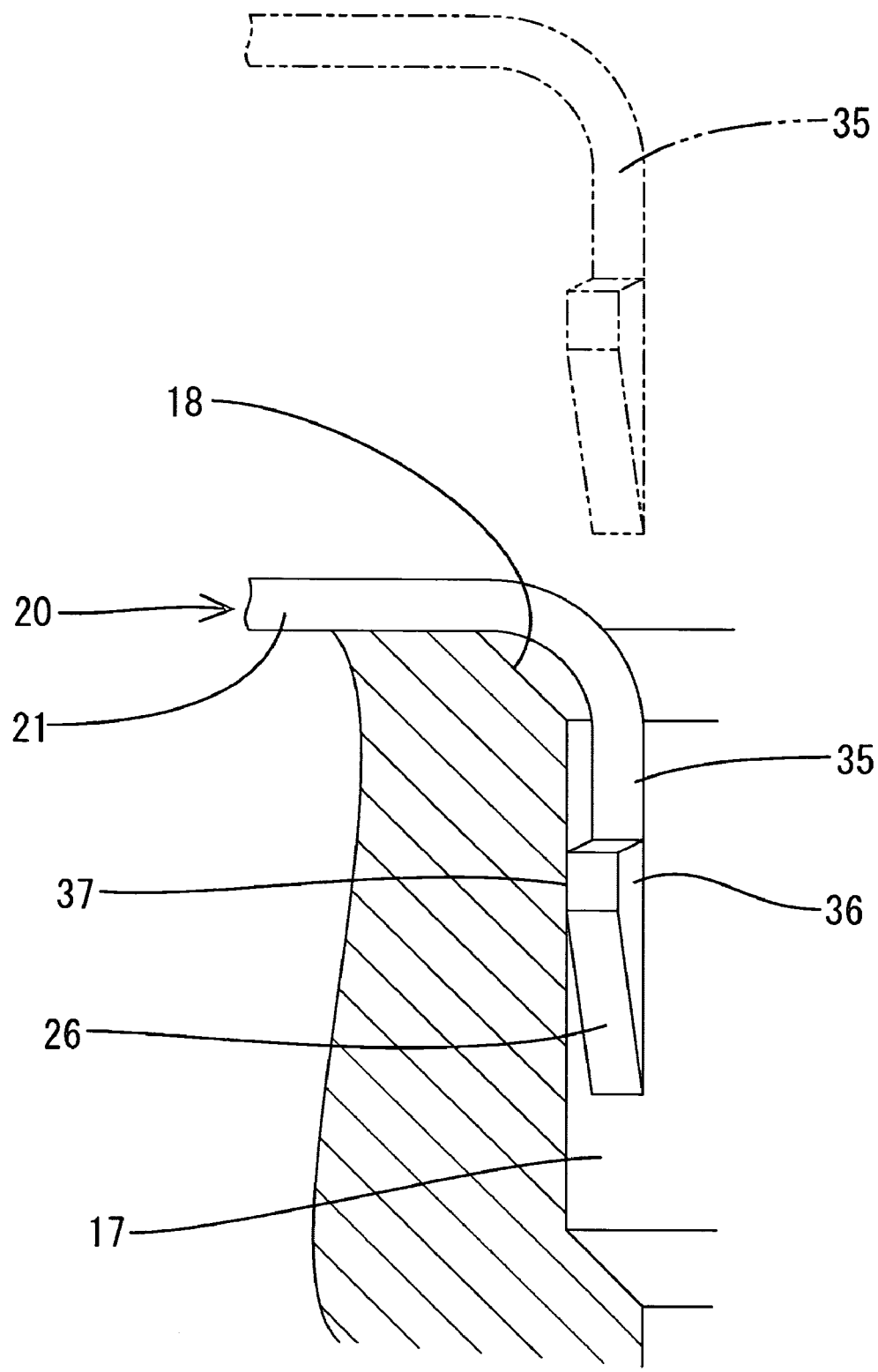
FIG. 17 is a sectional view showing the provisional engaging portion inserted in a non-threaded portion.

Accordingly, when each temporarily retaining portion 35 is inserted into the non-threaded portion 17, each temporarily retaining portion 35 is elastically deformed radially inward to be thrust into the non-threaded portion while the corners 37 of the projections 36 are in contact with the inner circumferential wall of the non-threaded portion 17 (see FIGS. 15 and 17). When having been inserted in the non-threaded portion 17, the temporarily retaining portions 35 elastically contact the inner circumferential wall of the non-threaded portion 17, and the corners 37 bite into the inner circumferential wall of the non-threaded portion 17. Consequently, each temporarily retaining portion 35 can be prevented from falling off.

In the third embodiment, an effective means for falling off from the caliper can be provided even when no falling-off preventing claws are provided. Consequently, a step of forming the falling-off preventing claws can be eliminated.

The other structure of the spacer in the third embodiment is the same as that in the first embodiment and accordingly, the same effect can be achieved from the third embodiment as from the first embodiment. Accordingly, the description of the other structure is eliminated.

Modified forms of the foregoing embodiments will be described. In the above-described embodiments, the spacer 20 is interposed between the steeling knuckle 12 and caliper 14 of the disc brake. However, the spacer may be interposed between other two members, instead.

In the foregoing embodiments, the caliper 14 is made of a metal and is discrete from the spacer 20. For example, however, the spacer may be temporarily retained on a resin fastening member and may be formed integrally with the fastening member by an insert molding, instead.

Each falling-off preventing claw 27 is made by cutting a part of each temporarily retaining portion and raising the cut part in the first and second embodiments. However, any claw-shaped projection protruding to the outer face side of the temporarily retaining portion may be provided, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A spacer made of a metal and interposed between opposed faces of two members having respective bores co-axial with each other and fastened to each other by inserting a fastening member into the bores and tightening the fastening member, the spacer comprising:
    a base interposed between the opposed faces of the members and having a through hole co-axial with the bores of the respective members so that the fastening member is inserted through the hole, the base lying in a plane and the through hole being coplanar with the base;
    a temporarily retaining portion extending directly from an open edge of the hole of the base in a direction substantially perpendicular to said plane for temporarily retaining the overall spacer on one of the members before the members are fastened to each other, the temporarily retaining portion being inserted into the bore of said one member and caught on a wall defining the bore; and
    the temporarily retaining portion having a pair of projections formed on respective opposite sides of a distal end thereof so that the projections extend in a circumferential direction of the hole of the base, each projection including a lower edge formed to be upwardly inclined when the temporarily retaining portion is inserted into the bore of said one member, each projection being brought into sliding contact with the open edge of the bore of said one member so that the overall spacer is moved toward a central axis of the bore of said one member.

2. A spacer according to claim 1, which has a surface to which an insulating coating is applied.

3. A spacer according to claim 1, wherein the temporarily retaining portion is located at an outer peripheral side of the fastening member so as to be non-contact with the fastening member.

4. A spacer according to claim 1, wherein the temporarily retaining portion is flexibly bent at the open edge of the hole of the base so as to extend substantially axially and is in contact with the wall of the bore with a spring force pressing the temporarily retaining portion against the wall.

5. A spacer according to claim 4, wherein a plurality of the temporarily retaining portions are provided on the open edge of the hole of the base at regular intervals.

6. A spacer according to claim 4, wherein the temporarily retaining portion includes a root portion and two slits formed in both widthwise ends of the root portion so as to extend from the open edge of the hole axially outward, respectively.

7. A spacer according to claim 1, wherein the temporarily retaining portion has a falling-off preventing claw formed thereon by cutting a part thereof and raising the cut part, so as to be engaged with the wall of the bore of said one member.

8. A spacer according to claim 1, wherein both projections are stamped out of the base while lower edges of the projections are inclined from the lower edge of the temporarily retaining portion.

9. A spacer according to claim 1, wherein both projections are stamped out of the base while the lower edges of the projections are substantially coplanar with the lower edge of the temporarily retaining portion, and thereafter, both projections are bent inward along bending edges between the temporarily retaining portion and the projections, respectively, whereupon the lower edges of the projections are inclined relative to the lower edge of the temporarily retaining portion, the projections being bent toward the axial center of the bore of said one member at the respective bending edges.

10. A spacer according to claim 8, wherein both projections are bent outward along bending edges between the temporarily retaining portion and the projections so that side edges of the projections engage the wall of the bore of said one member, whereby the overall spacer is temporarily held, respectively, the projections being bent toward the axial center of the bore of said one member at the respective bending edges.

* * * * *